Oct. 26, 1965   J. HEZLER, JR., ETAL   3,214,213
FLEXIBLE GLASS VEHICLE WINDOW
Filed April 30, 1963

INVENTORS
Julius Hezler, Jr. &
BY George C. Barnier

E. E. James
ATTORNEY

Oct. 26, 1965  J. HEZLER, JR., ETAL  3,214,213
FLEXIBLE GLASS VEHICLE WINDOW
Filed April 30, 1963  3 Sheets-Sheet 2
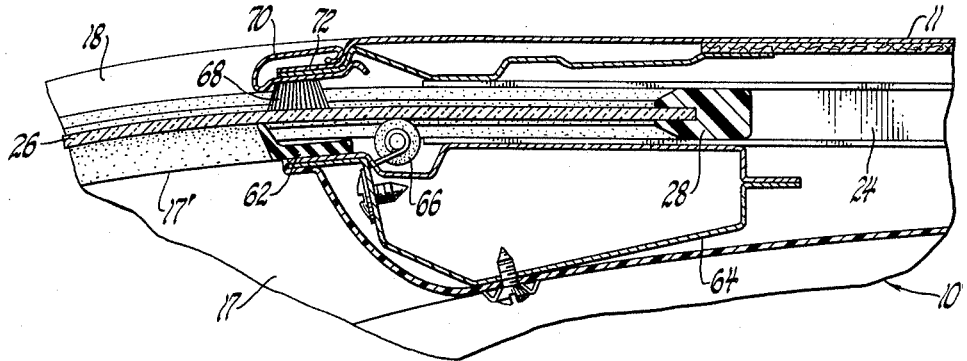
Fig. 3
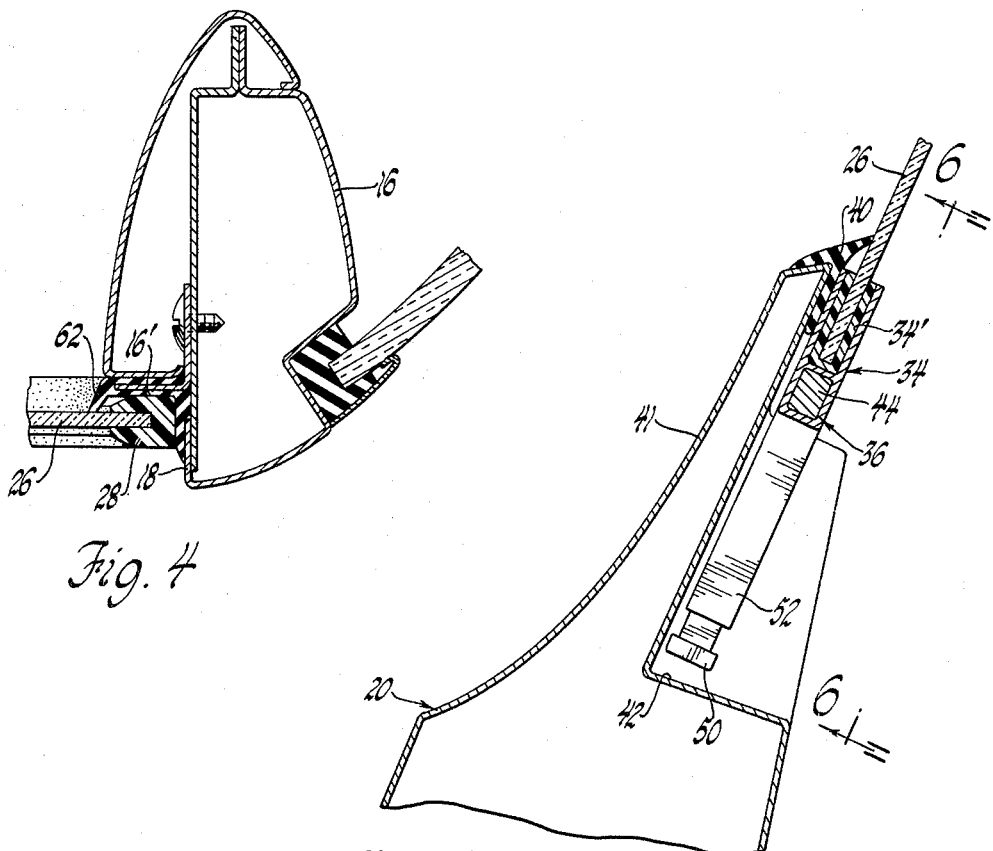
Fig. 4
Fig. 5
INVENTORS
Julius Hezler, Jr. &
BY George C. Barnier
E. E. James
ATTORNEY

3,214,213
FLEXIBLE GLASS VEHICLE WINDOW
Julius Hezler, Jr., East Detroit, and George C. Barnier, Bloomfield Hills, Mich., assignors to General Motors Corporation, Detroit, Mich., a corporation of Delaware
Filed Apr. 30, 1963, Ser. No. 276,907
3 Claims. (Cl. 296—44)

This invention relates generally to a window structure; more particularly to a retractable window for vehicle bodies and the like; and with regard to certain specific aspects, to a retractable window cooperating with a door movable to close an access opening to the passenger or load compartment of an automotive vehicle.

In the past, automotive vehicle doors have had windows mounted for movement between a retracted opened position within the door and an extended position closing a window opening defined either by the upper door frame or defined between the door and the upper portion of the door opening. For safety, these windows have been of relatively thick tempered glass and therefore quite heavy. The required thickness and weight of such window mounting doors have necessitated the use of relatively heavy, rugged hinges, door checks and hold-open devices and have often required counterbalancing to assist door opening and closing movement. In doors of substantial width, the weight of the window glass makes it desirable to provide power means selectively operable to actuate the window between its opened and closed positions. Retractable window doors also present problems relating to proper sealing of both the window and door. Provision must also be made for the disposal of moisture collected in the interior of the door to prevent destructive rusting of the door, corrosion and fouling of the window regulating mechanism, and leakage through the interior door panels.

In certain vehicles such as station wagons, a window framing door has been hinged to the underroof structure for swinging movement relative to the upper portion of the vehicle body door opening. The weight of the tempered safety glass and its supporting door frame generally require the use of relatively heavy-duty counterbalanced hinges capable of maintaining the opened window mounting door clear of the door opening. The housings for such hinges necessarily protrude downwardly and substantially reduce the effective heighth of the door opening. Such window mounting doors also present sealing problems with respect to the adjacent pillars and roof portion and with respect to the door closing the lower body portion of the access opening. Such cooperating doors also require a latch mechanism capable of latching the lower door with respect to both the lower body portion and the window mounting upper door.

The instant invention broadly contemplates the use of a flexible high strength glass window of relatively thin section and reduced weight mounted for movement in a vehicle body and bendable between an opened position retracted within the body structure and an extended position closing a window opening defining a smooth continuous window bending curvature between these extreme window positions. The invention further contemplates the provision of a relatively simple, inexpensive means for mounting and sealing such a flexible glass window for actuation between its extreme window positions without binding. With regard to its more specific aspects, the invention provides a flexible glass window bendable from a pre-formed curvature by movement effected between its retracted and extended window closing positions.

The invention has particular application to an automotive station wagon vehicle and is shown and described in such an environment. In the illustrative embodiment, the vehicle body has an interior passenger and load compartment defined between a roof structure and a lower body portion. A plurality of spaced pillars support the roof above the lower body portion and form a plurality of window and door openings therebetween. Two rear pillars define a door opening accessible to the rear of interior compartment. The lower portion of this rear opening is closable by a tailgate door or closure member hinged for swinging movement about a horizontal axis between a substantially horizontal opened position and a vertically inclined closed position. Above this lower door, the rear body pillars are shouldered and curved upwardly and forwardly of the vehicle to provide a curved window engaging opening and an outer body contour substantially continuous with the outer curvature of the adjacent roof structure.

A pair of laterally opposed guide channel members are mounted within the underroof body structure and are smoothly and continuously coextensive with curved window engaging shoulders extending downwardly of the rear body pillars above the lower body and the tailgate. A window of high strength safety glass is slidably mounted in the opposing underroof guide channels by channeled bearing members of flexible plastic suitably secured to opposite sides of the window glass. Such mounting of the flexible glass window permits movement between an underroof retracted opened position and an extended position from which the window is bendable into curved window closing sealed engagement with the shoulders formed on the rear body pillars and the upper edge of the rear tailgate member. The flexible window member is preferably formed to provide an unrestrained curvature in its extended position intermediate oppositely deflected curvatures in its extreme window opening and closing positions. The flexible window is maintainable in its closed position by suitable latch means carried by the lower edge of the glass and transversely engageable with cooperating latch means provided on the rear body pillar and/or the rear tailgate member.

While the invention has particular utility in the station wagon rear window application of the illustrative embodiment, it is not so limited being equally applicable in certain of its broader and more specific aspects to other retractable window structures for vehicle bodies and like enclosures.

The foregoing and other objects, advantages and features of the invention will be apparent from the following description of the illustrative embodiment, having reference to the accompanying drawings, in which:

FIGURE 3 is an enlarged fragmentary sectional view similar to a portion of FIGURE 2 but taken substantially in the direction of the arrows and in the plane of the line indicated at 3—3 of FIGURE 1 to show the slidable mounting of the flexible glass rear window in greater detail;

FIGURE 4 is a fragmentary sectional view showing the flexible glass window in closed sealing engagement with the right rear window pillar substantially in the plane of the line indicated at 4—4 in FIGURE 1;

FIGURE 5 is an enlarged fragmentary sectional view similar to a second portion of FIGURE 2 taken substantially in the plane of the line indicated at 5—5 in FIGURE 1 and shows the flexible glass window and tailgate in their cooperating latch maintained closed positions;

Figure 6:
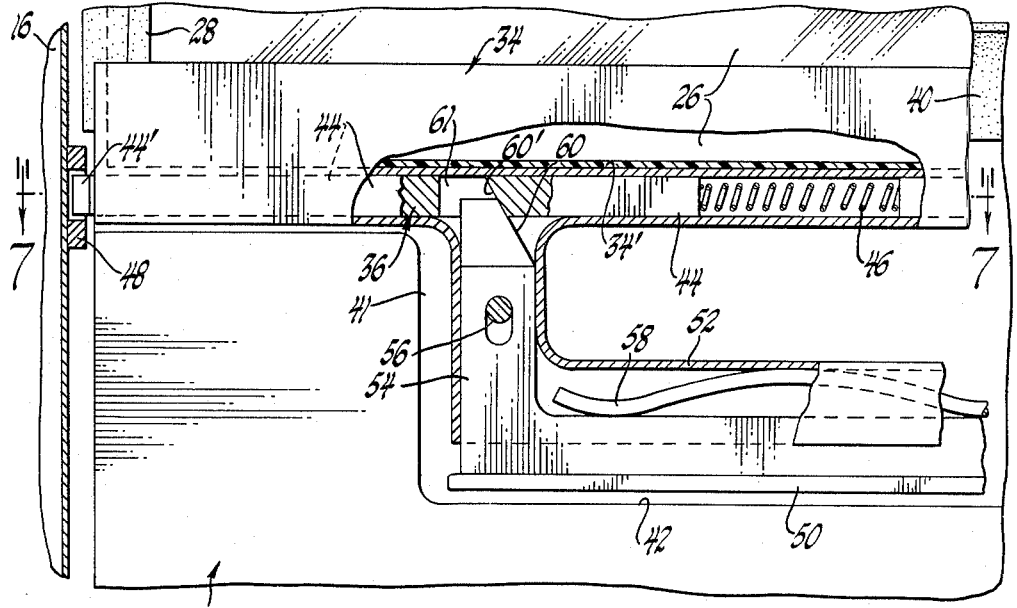
Figure 7:
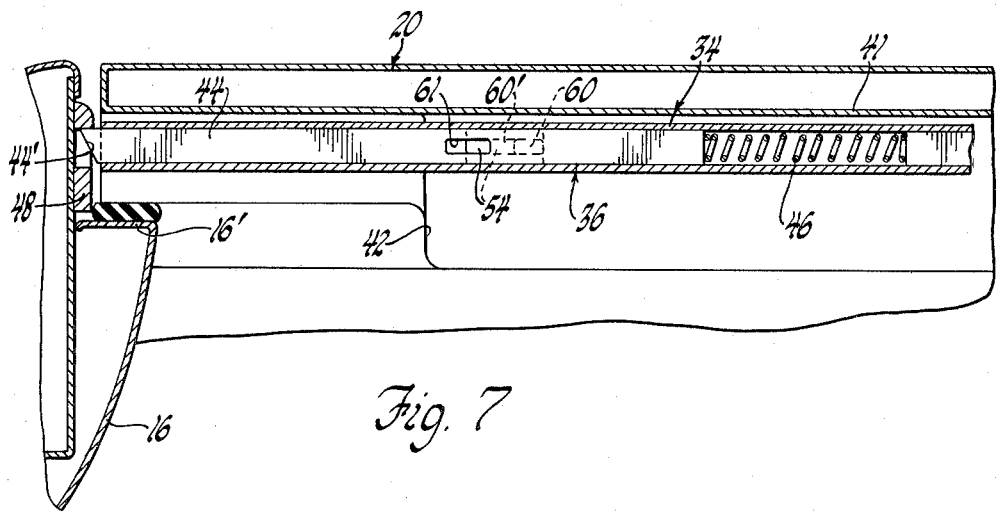

FIGURE 6 is a fragmentary elevational view taken substantially in the direction of the arrows indicated at 6-6 of FIGURE 5 with portions broken away and sectioned to show a window carried latch mechanism operably engageable with the adjacent rear body pillar and tailgate to maintain the downwardly bent window in its closed position; and FIGURE 7 is a fragmentary sectional view taken substantially in the direction of the arrows and in the plane of the line indicated at 7—7 of FIGURE 6 and shows the pillar engaging latch mechanism in greater detail.

Figure 1:
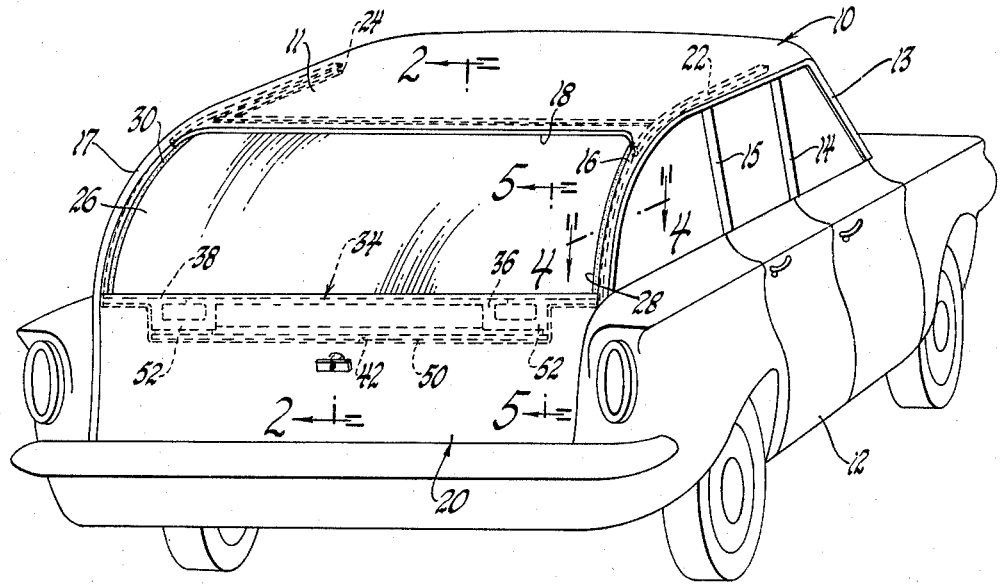
FIGURE 1 is a right rear quarter perspective view of a station wagon automotive vehicle having a flexible glass rear window retractably mounted and bendable to a curved closed position in accordance with the invention.

Referring more particularly to FIGURE 1, the body of a station wagon automotive vehicle is indicated generally by the reference numeral 10 and has a closed passenger and load compartment. A roof structure 11 is supported in spaced relation above the lower body portion 12 by a plurality of spaced pillars 13, 14, 15, 16 and 17 forming a plurality of door and window openings therebetween. The two rear pillars 16 and 17 cooperate with the roof structure 11 to define a rear window opening 18 above a tailgate or closure member 20 suitably hinged in a conventional manner for swinging movement about a horizontal axis between a vertically inclined closed position and a substantially horizontal position rearwardly continuing the load deck of the interior load compartment.

Figure 2:
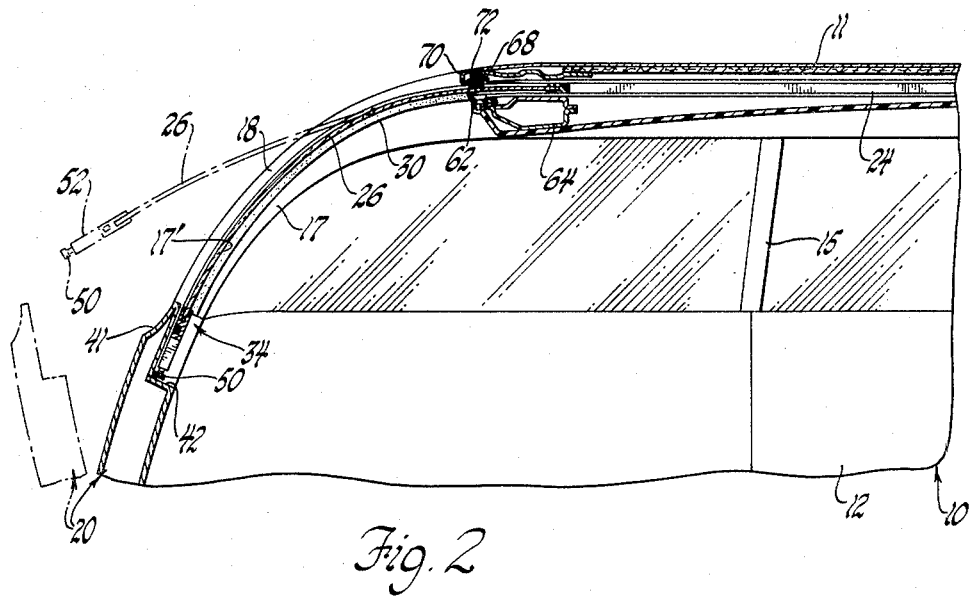
FIGURE 2 is a fragmentary sectional view taken substantially in the plane of the line indicated at 2—2 of FIGURE 1 and shows the extended unrestrained curvature and bent closed positions of the slidably mounted flexible glass window relative to the curved rear opening of the station wagon body.

As best seen in FIGURES 1 and 2, the rear pillars 16 and 17 are curved forwardly above the tailgate and lower body to provide a curved rear window opening and body contour having substantially continuous curvature with the roof. Window engaging shoulders 16' and 17' are formed laterally inwardly of the rear pillars above the tailgate as shown in FIGURES 3 and 4. These shoulders are curved with the rear pillars to coextend smoothly and continuously from opposing window storing guide channel members 22 and 24 mounted within the underroof structure.

A rear window 26 of a flexible high strength safety glass, such as Chemcor, is pre-formed to an intermediate unrestrained curvature and slidably mounted within the laterally spaced guide channel members 22 and 24 by a pair of flexible channel bearings 28 and 30. These flexible channels are preferably formed of a suitable plastic bearing material, such as nylon or Teflon, and secured to opposite sides of the flexible glass window. Such slidable mounting permits manual movement of the window between an opened position retracted within the underroof structure and an extended cantilevered position partially closing the window opening as shown in broken lines in FIGURE 2. Such window actuating movement is manually effected in the illustrative embodiment by a combined handle and latch housing member 34 secured to and extending transversely of the depending edge of the window glass. In moving to its underroof retracted position, the window is deflected by the mounting guide channels to assume a relatively flat curvature. Upon moving toward its extended position, the window returns to or assumes its unrestrained curvature.

The flexible glass window is bendable manually from its curved intermediate position to a fully closed position shown in full lines in FIGURE 2. Latch mechanisms 36 and 38 are mounted within opposite ends of the window mounted handle mamber 34 and laterally engage strikers on the adjacent rear pillars to maintain such window closing flexure. In this latch maintained, fully closed window position, the flexible plastic channels 28 and 30 sealingly engage the lateral shoulders of the rear pillars. The transverse lower edge portion of the closed window is also sealingly engageable with a weatherseal 40 mounted on a flange 41 partially defining a window and handle receiving recess 42 formed in the upper edge of the tailgate.

As best seen in FIGURES 5, 6 and 7 specifically illustrating the right-hand latch mechanism 38, the window handle and latch housing member 34 of the illustrative embodiment is channeled at 34' and suitably secured transversely of the depending edge of the window glass. The latch mechanisms 36 and 38 each include a slide bolt 44 reciprocably mounted and biased by a spring 46 laterally outwardly of the handle and latch housing member 34. The spring biased bolts 44 are adapted to latchably engage a striker plate 48 adjustably secured to the adjacent rear pillar. The striker engaging end of the bolt is beveled at 44', as best shown in FIGURE 7, to provide striker camming reaction of the bolt and thus permit movement of the flexible glass window to its closed position.

A latch operating bar 50 is reciprocably mounted within the transverse handle portions 52 of the member 34 by two laterally spaced legs 54, only one being shown, formed on opposite ends of the bar. These bar mounting legs each have a movement limiting pin-and-slot connection at 56. A leaf spring 58 is interposed between and normally biased the latch operating bar outwardly of each handle portion 52 within the limits of the pin-and-slot connections 56. The two laterally spaced legs 54 each have a beveled cam toe 60. These cam toes are each slidably engageable with a mating inclined ramp 60' formed at the inner end of a slot 61 formed intermediate the ends of each of the slide bolts 44. With depression of the operating bar upwardly into the handle member, as viewed in FIGURE 6, the beveled toes 60 simultaneously cam their respective slide bolts inwardly to retracted striker clearing positions. In the illustrative embodiment, access for such actuation of the operating bar occurs only when the tailgate is opened. Such simultaneous bar operated bolt retraction on both sides of the closed window permits return deflection of the flexible window to its intermediate unrestrained partially opened position.

As indicated above, the curved flexure of the window 26 in its latch maintained closed position tends to suitably seal the flexible plastic bearing members 28 and 30 with the curved shoulders 16' and 17' formed on the adjacent rear body pillars. As shown in FIGURES 3 and 4, a simple lip seal 62 may be mounted by the pillars 16 and 17 and a transverse rear roof header 64 engages the inner surface of the flexible glass 26 in its closed position and further assures proper sealing of the window. As shown in FIGURE 3, the window glass 26 is preferably supported adjacent the window opening in the roof by a plurality of leaf spring mounted rollers 66 spaced laterally of the rear roof header 64. These rollers bias and maintain the upper surface of the glass in sealing engagement with a felt or pile fabric seal 68 carried by a molding strip 70 suitably secured to a roof terminating pinchweld 72 extending transversely of the vehicle in slightly spaced parallel relation above the rear roof header 64.

From the foregoing description, it will be seen that the illustrative rear station wagon window embodiment provides a relatively simple, inexpensive means for accomplishing the various objects and advantages of the invention. It will be further apparent that the invention is capable of similar advantageous application in other retractable window installations and that various modifications and changes might be made in and from the disclosed structure without departing from the spirit and scope of the invention as defined in the following claims.

We claim:

1. In a vehicle body, the combination comprising, means defining a curved window opening in said body, guide means mounted on said body adjacent said opening and merging with said window opening defining means, said guide means being adapted to guidingly restrain edges of a window closure and having a degree of curvature substantially differing from the degree of curvature of said opening, and a window closure of resilient semirigid construction mounted for movement in said guide means between a retracted position within said body wherein edges of said closure are substantially wholly restrained within said guide means and an extended position wherein edges of said closure are substantially wholly without said guide means and otherwise substantially wholly unrestrained, said closure being preformed into a degree of curvature substantially differing from both the degree of curvature of said window opening and of said guide means, said closure upon movement to said extended position thereof being resiliently bendable from said preformed curvature into a degree of curvature conforming to that of said window defining means and upon movement to the retracted position thereof being resiliently bendable from said predetermined curvature into a degree of curvature conforming to that of said guide means.

2. In a vehicle body, the combination comprising, means defining a curved window opening in said body, guide channel means mounted on said body adjacent said opening and merging with said window defining means, said guide channel means being adapted to envelope and guidingly restrain edges of a window closure, sealing abutment shoulder means mounted adjacent said window opening, a window closure of resilient semirigid construction mounted for movement in said guide means betwee a retracted position with said body wherein edges of said closure are substantially wholly contained and restrained within said guide channel means and an extended position wherein edges of said closure are substantially wholly without said guide channel means and otherwise substantially wholly unrestrained, said closure being preformed into a degree of curvature substantially differing from that of said window opening, said closure upon movement to said extended position thereof being resiliently bendable from said preformed curvature into engagement with said abutment shoulder means and into a degree of curvature conforming to that of said window opening, and means for restraining said closure in said conforming curvature thereof.

3. The combination recited in claim 2 wherein said restraining means includes releasable latch means on said closure and on said body.

References Cited by the Examiner
UNITED STATES PATENTS

| | | | |
|---|---|---|---|
| 2,235,454 | 3/41 | Koropchak | 62—265 X |
| 2,258,972 | 10/41 | Carlson | 160—363 X |
| 2,361,762 | 10/44 | Glenn | 160—23 |
| 2,759,773 | 8/56 | Wilmer | 296—44.5 X |

MILTON BUCHLER, *Primary Examiner.*

A. HARRY LEVY, *Examiner.*

UNITED STATES PATENT OFFICE
CERTIFICATE OF CORRECTION

Patent No. 3,214,213　　　　　　　　　　　　　　October 26, 1965

Julius Hezler, Jr., et al.

It is hereby certified that error appears in the above numbered patent requiring correction and that the said Letters Patent should read as corrected below.

Column 4, line 24, for "biased" read -- biases --;
column 6, lines 1 and 2, for "betwee" read -- between --;
line 2, for "with" read -- within --.

Signed and sealed this 19th day of July 1966.

(SEAL)
Attest:

ERNEST W. SWIDER　　　　　　　　　　　　　　EDWARD J. BRENNER
Attesting Officer　　　　　　　　　　　　　　　Commissioner of Patents